Patented Feb. 8, 1938

2,107,650

UNITED STATES PATENT OFFICE 2,107,650

PREPARATION OF PENTACHLOROPHENOL

Frank B. Smith and John E. Livak, Midland, Mich., assignors to The Dow Chemical Company, Midland, Mich., a corporation of Michigan No Drawing. Application April 26, 1937, Serial No. 138,939

3 Claims. (Cl. 260—154)

This invention concerns the preparation of pentachlorophenol by the hydrolysis of hexachlorobenzene.

Pentachlorophenol has been prepared from hexachlorobenzene by Webber and Wolff (Ber. 18 335), who found that when 1 molecular proportion of hexachlorobenzene was reacted upon by approximately 7 molecular proportions of caustic soda in the form of a 17 per cent ethyl alcoholic solution for several hours at 150°–160° C., a portion of the hexachlorobenzene was hydrolyzed to give a mixture of products among which was pentachlorophenol. Finding that a large part of the hexachlorobenzene remained unchanged in the reaction, they tried amyl alcohol and glycerine as solvents for the reaction and reported that with these relatively high-boiling solvents a more satisfactory and complete reaction was possible, particularly when the hydrolysis was carried out at temperatures between 250° and 280° C.

Among the objects of the present invention are to provide a process which (1) makes use of an inexpensive and readily available alcohol as a reaction solvent; (2) is operable with more nearly theoretical amounts of sodium hydroxide; (3) results in the hydrolysis of substantially all of the hexachlorobenzene present in the reaction mixture; (4) produces pentachlorophenol to the practical exclusion of other phenolic and tarry decomposition products; and (5) results in a pentachlorophenol product of sufficient purity to be suitable for use as a practical commercial product without the necessity of intermediate purification operations thereon.

We have discovered that hexachlorobenzene can be reacted with critical proportions of methyl alcoholic sodium hydroxide solution to form pentachlorophenol without the simultaneous production of appreciable amounts of other chlorophenolic compounds and tarry decomposition products. In carrying out this reaction, between 2.25 and 2.75 molecular proportions of sodium hydroxide, 1 molecular proportion of hexachlorobenzene, and sufficient methyl alcohol to form from a 5 to 15 per cent by weight solution of the sodium hydroxide, are mixed together and heated to and maintained at 130°–140° C. for a suitable period under the vapor pressure of the reaction mixture at the temperature employed. The reaction is generally complete after from about 1.5 to 3 hours of heating, although a somewhat longer time may be required. Following the completion of the reaction the alcohol is distilled out of the crude reaction mixture and the pentachlorophenol separated from salt formed during the reaction by dissolving the residual solid reaction product in water, acidifying with inorganic acid, and filtering off the precipitated phenol product. A quantitative hydrolysis of the hexachlorobenzene to pentachlorophenol is thereby accomplished to the substantial exclusion of undesired phenolic, ether, and decomposition products.

Reaction temperatures lower than 130° C. lead to the incomplete reaction of the hexachlorobenzene and to the presence of substantial quantities of the methyl ether of pentachlorophenol in the reaction product. Temperatures higher than 140° C. result in the removal of a plurality of chlorine atoms from the hexachlorobenzene molecule and the formation of tarry decomposition products in amounts increasing with the increase of temperature. The presence of these decomposition products, many of which are alkali insoluble, necessitates the purification of the crude pentachlorophenol product, e. g. by crystallization from organic solvent.

The use of a lesser proportion of sodium hydroxide than pointed out above leads to incomplete reaction of the hexachlorobenzene, while a greater proportion promotes decomposition of the product and the formation of undesired tarry by-products. The use of the sodium hydroxide in 5 to 15 per cent methyl alcoholic solution rather than in more concentrated form is conducive to a moderate and controllable reaction and substantially eliminates the local overheating and resultant tar formation which is frequently a characteristic of hydrolytic processes. The methyl alcohol employed as reaction solvent is readily recovered by direct distillation following the completion of the hydrolysis step, and boils at a sufficiently low temperature to preclude tar formation and decomposition of the mixture during the solvent recovery step.

The following example is illustrative of one mode in which the invention may be carried out, but is not to be construed as limiting the same.

Example

A mixture of 285 grams (1 mole) of hexachlorobenzene (m. p. 225°–226° C.), 100 grams (2.5 moles) of anhydrous sodium hydroxide, and 640 grams (20 moles) of absolute methyl alcohol was charged into a pressure reactor equipped with means for continuous agitation, and the mixture was heated at 135° C. for 2 hours under the vapor pressure thereof. The reactor was then cooled, opened, and the contents removed. The crude reaction product was filtered to separate therefrom solid sodium chloride formed as a reaction by-product and undissolved sodium pentachlorophenolate. The filtrate, a clear reddish-brown alcoholic solution of sodium pentachlorophenolate, was then warmed whereby the methyl alcohol was distilled off and recovered. The residue from this distillation was combined with the solid residue from the filtration, and dissolved in approximately 1 liter of water. The clear solution so obtained was acidified to Congo red with 20 per cent aqueous hydrochloric acid solution, whereupon a light colored flocculent precipitate separated. This precipitate was recovered by filtration, washed with water, and dried for 16 hours at 70° C. whereby there was obtained 265.5 grams (0.99 mole) of pentachlorophenol melting at 159°–178° C., and boiling at approximately 202° C. (uncorrected) at 27 millimeters mercury pressure absolute. Analysis of this product showed it to contain only 0.29 per cent alkali insoluble material and to have a chlorine content of 65.55 per cent by weight as compared to a 66.7 per cent as theory.

If desired, following the hydrolysis step above, the methyl alcohol may be distilled directly out of the pressure reactor thereby utilizing the residual heat content of the reactor and reaction mixture. When this is done the solid reaction product may be conveniently recovered by repeated extraction of the distillation residue with small portions of water and subsequently acidifying the aqueous extract to recover pentachlorophenol.

The crude product obtained in the above example is suitable without further purification for use as a fungicide, for example, either as the free phenol or in the form of its sodium salt. Where a substantially pure pentachlorophenol is desired, a single recrystallization of the crude product generally suffices to remove the traces of impurities which contribute to the slightly lowered melting point of the unpurified product described above.

Other modes of applying the principle of our invention may be employed instead of those explained, change being made as regards the method herein disclosed, provided the step or steps stated by any of the following claims or the equivalent of such stated step or steps be employed.

We, therefore, particularly point out and distinctly claim as our invention:

1. In a method for the preparation of pentachlorophenol, the step which consists in heating 1 molecular proportion of hexachlorobenzene with from 2.25 to 2.75 molecular proportions of sodium hydroxide as a 5 to 15 per cent by weight solution in methyl alcohol at a temperature between 130° and 140° C. under the vapor pressure of the reaction mixture at the temperature employed.

2. In a method for the preparation of pentachlorophenol, the step which consists in heating 1 molecular proportion of hexachlorobenzene with approximately 2.5 molecular proportions of sodium hydroxide dissolved in methyl alcohol, at a temperature between 130° and 140° C. under the vapor pressure of the reaction mixture at the temperature employed, the amount of methyl alcohol present in the reaction zone being sufficient to form between a 5 and 15 per cent by weight solution of the sodium hydroxide.

3. A method for the preparation of pentachlorophenol which consists in heating a mixture consisting of 1 molecular proportion of hexachlorobenzene, 2.5 molecular proportions of sodium hydroxide, and sufficient methyl alcohol to form a 5 to 15 per cent by weight solution of the sodium hydroxide, at a temperature of approximately 135° C. under the vapor pressure of the reaction mixture at the temperature employed, thereafter distilling the methyl alcohol from the reaction mixture, dissolving the solid residue in water, acidifying such solution to precipitate therefrom the phenolic reaction product, and recovering the same by filtration.

FRANK B. SMITH.
JOHN E. LIVAK.